United States Patent
Zhu et al.

(10) Patent No.: US 10,866,866 B2
(45) Date of Patent: Dec. 15, 2020

(54) QUERY FAULT PROCESSING METHOD AND PROCESSING APPARATUS

(71) Applicant: Huawei Technologies Co., Ltd., Shenzhen (CN)

(72) Inventors: Jinwei Zhu, Beijing (CN); Qingqing Zhou, Santa Clara, CA (US); Pinggao Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 16/234,095

(22) Filed: Dec. 27, 2018

(65) Prior Publication Data

US 2019/0129811 A1 May 2, 2019

Related U.S. Application Data

(63) Continuation of application No. PCT/CN2017/071709, filed on Jan. 19, 2017.

(30) Foreign Application Priority Data

Jun. 29, 2016 (CN) .......................... 2016 1 0505556

(51) Int. Cl.
*G06F 11/00* (2006.01)
*G06F 11/14* (2006.01)
(Continued)

(52) U.S. Cl.
CPC ...... *G06F 11/1469* (2013.01); *G06F 11/1451* (2013.01); *G06F 16/2455* (2019.01); *G06F 16/24542* (2019.01); *G06F 2201/84* (2013.01)

(58) Field of Classification Search
CPC ............. G06F 11/1469; G06F 16/2455; G06F 16/2425; G06F 16/24537; G06F 16/24542; G06F 16/24553
See application file for complete search history.

(56) References Cited

U.S. PATENT DOCUMENTS

| 8,938,644 B2* | 1/2015 | Clark ................... G06F 11/142 |
| | | 714/16 |
| 10,409,812 B2* | 9/2019 | Barsness ........... G06F 16/24542 |

(Continued)

FOREIGN PATENT DOCUMENTS

| CN | 102663117 A | 9/2012 |
| CN | 103136363 A | 6/2013 |

(Continued)

OTHER PUBLICATIONS

Machine Translation and Abstract of Chinese Publication No. CN102663117, Sep. 12, 2012, 22 pages.

(Continued)

*Primary Examiner* — Christopher S McCarthy
(74) *Attorney, Agent, or Firm* — Conley Rose, P.C.

(57) ABSTRACT

A method for processing query fault, where a database server receives a query statement and generates a corresponding query plan tree including multiple layers of operators in a pipeline relationship, and each layer includes operation symbols having logical relationship with each other. The server executes the query statement according to the query plan tree, extracts intermediate status information of a faulty operator when a fault occurs in a process of executing the query statement, updates operation symbols of the faulty operator and a logical relationship among the operation symbols according to the query plan tree and the intermediate status information to obtain a reconstructed query plan tree, and continues to execute the query statement according to the reconstructed query plan tree after the fault is recovered.

20 Claims, 9 Drawing Sheets

(51) Int. Cl.
*G06F 16/2453* (2019.01)
*G06F 16/2455* (2019.01)

(56) References Cited

U.S. PATENT DOCUMENTS

| | | | |
|---|---|---|---|
| 10,521,430 B1 * | 12/2019 | Schreier | G06F 16/24561 |
| 2005/0154740 A1 * | 7/2005 | Day | G06F 16/24549 |
| 2006/0136396 A1 * | 6/2006 | Brobst | G06F 16/284 |
| 2006/0274761 A1 | 12/2006 | Error et al. | |
| 2008/0177694 A1 * | 7/2008 | Chaudhuri | G06F 16/24542 |
| 2010/0312776 A1 * | 12/2010 | Burrichter | G06F 16/2425 |
| | | | 707/759 |
| 2013/0290295 A1 | 10/2013 | Soules et al. | |
| 2014/0310258 A1 | 10/2014 | Tian et al. | |
| 2016/0306714 A1 * | 10/2016 | De Smet | G06F 11/1469 |
| 2018/0107712 A1 * | 4/2018 | Aldrich | G06F 16/2455 |
| 2018/0121426 A1 * | 5/2018 | Barsness | G06F 9/5011 |
| 2019/0205448 A1 * | 7/2019 | Sharma | G06F 16/24549 |

FOREIGN PATENT DOCUMENTS

| | | |
|---|---|---|
| CN | 103559245 A | 2/2014 |
| CN | 103793538 A | 5/2014 |
| CN | 105677812 A | 6/2016 |
| CN | 105701128 A | 6/2016 |
| EP | 2922274 A1 | 9/2015 |

OTHER PUBLICATIONS

Machine Translation and Abstract of Chinese Publication No. CN103559245, Feb. 5, 2014, 29 pages.
Machine Translation and Abstract of Chinese Publication No. CN103793538, May 14, 2014, 9 pages.
Foreign Communication From a Counterpart Application, PCT Application No. PCT/CN2017/071709, English Translation of International Search Report dated Apr. 25, 2017, 2 pages.
Foreign Communication From a Counterpart Application, PCT Application No. PCT/CN2017/071709, English Translation of Written Opinion dated Apr. 25, 2017, 5 pages.

* cited by examiner

| Name name | Product identifier PID | Row identifier ROW ID | Column identifier OID | Customer ID CUST ID |
|---|---|---|---|---|
| BX01 | 301 | 1 | 500 | AAA |
| BX01 | 301 | 3 | 503 | YYY |
| CX01 | 302 | 3 | 501 | BBB |
| CX01 | 302 | 3 | 502 | XXX |

QUERY FAULT PROCESSING METHOD AND PROCESSING APPARATUS

CROSS-REFERENCE TO RELATED APPLICATIONS

This application is a continuation of International Patent Application No. PCT/CN2017/071709 filed on Jan. 19, 2017, which claims priority to Chinese Patent Application No. 201610505556.5 filed on Jun. 29, 2016. The disclosures of the aforementioned applications are hereby incorporated by reference in their entireties.

TECHNICAL FIELD

This application relates to the field of computer technologies, and in particular, to a query fault processing method and processing apparatus.

BACKGROUND

A database system is the most challenging and core part of an entire software building, and a complete database system usually includes two parts a database and a database management system (also referred to as DBMS). As an era of big data arrives, the database usually needs to store massive data, and a user queries data in the database using the database management system. To meet query service requirements of different users in different environments, the database system needs to be extremely robust to ensure normal running of a query service. Actually, there is still a possibility that a fault occurs in the database system because of complexity of a service environment and diversity of factors that affect database stability.

For some query services with relatively high complexity and relatively long query time, a database system fault leads to query service interruption, and subsequent operation re-execution seriously affects progress of a whole service. Operation re-execution is re-query that is started anew. Further, for an enterprise that needs to ensure that a service ends on time and is used for market analysis, a delay in progress has disastrous impact.

SUMMARY

Embodiments of this application provide a query fault processing method to reduce impact exerted on an entire query process by query interruption. The embodiments of this application further provide a corresponding processing apparatus.

A first aspect of this application provides a query fault processing method that is applied to a database management system. The database management system may be implemented by a database server, and the database server communicates with an external storage apparatus of a database using a communications network. If a query fault occurs when the database management system executes a query statement, the query fault processing method includes receiving the query statement and generating a query plan tree corresponding to the query statement, where the query plan tree includes multiple layers of operators that are in a pipeline relationship, each layer includes at least one operator, and each operator includes operation symbols and a logical relationship between the operation symbols, executing the query statement according to the query plan tree, extracting intermediate status information of a faulty operator when the fault occurs in a process of executing the query statement, where the intermediate status information is backed up at a backup time point before the execution fault occurs, the intermediate status information indicates an operation completed by the faulty operator and an operation uncompleted by the faulty operator at the backup time point, and the faulty operator is an operator that is executing the query statement when the execution fault occurs, updating operation symbols of the faulty operator and a logical relationship between the operation symbols according to the query plan tree and the intermediate status information of the faulty operator, to obtain a reconstructed query plan tree, and continuing to execute the query statement according to the reconstructed query plan tree after the fault is recovered, to obtain a query result of the query statement. The query fault described in the embodiment of this application may include an execution node fault, a machine fault, an abnormal network disconnection, or the like. It may be learned from the foregoing first aspect that reconstruction of the query plan tree using the intermediate status information of the faulty operator can ensure that execution of a current query statement can be continued after a database system fault is recovered such that impact exerted on an entire query process by query interruption is reduced.

With reference to the first aspect, in a first possible implementation, the query fault processing method further includes selectively backing up the intermediate status information of the faulty operator based on a backup cost of an intermediate status of the faulty operator. The cost described in this embodiment of this application may be understood as a resource consumption amount. For example, a processor cost is a processor occupation amount, and a page read cost is a quantity of resources consumed for reading a service. It may be learned from the foregoing first possible implementation of the first aspect that whether the intermediate status information of the faulty operator is backed up is determined based on the backup cost, and the intermediate status information of the faulty operator is backed up only when the cost is low. In this way, not only operation execution can be continued, but also a hardware resource can be saved.

With reference to the first possible implementation of the first aspect, in a second possible implementation, the step of selective backup in the first possible implementation is periodically performed.

With reference to the first or the second possible implementation of the first aspect, in a third possible implementation, the step, in the foregoing first possible implementation, of selectively backing up the intermediate status information of the faulty operator based on a backup cost of an intermediate status of the faulty operator includes backing up the intermediate status information of the faulty operator when a cost reduced by continuing to execute the faulty operator is greater than a sum of a cost required for backing up the operation completed by the faulty operator and a cost required for recovering the operation uncompleted by the faulty operator. It may be learned from the foregoing third possible implementation of the first aspect that the intermediate status information of the faulty operator is backed up only when the cost reduced by continuing the execution is greater than the sum of the cost required for backing up the operation completed by the faulty operator and the cost required for recovering the operation uncompleted by the faulty operator. In this way, the hardware resource can be fully saved.

With reference to the first or the second possible implementation of the first aspect, in a fourth possible implementation, the step, in the foregoing first possible implementation, of selectively backing up the intermediate status information of the faulty operator based on a backup cost of an intermediate status of the faulty operator includes backing up the intermediate status information of the faulty operator when a cost of continuing to execute the faulty operator is less than a sum of a cost required for backing up the operation completed by the faulty operator and a cost required for recovering the operation uncompleted by the faulty operator. It may be learned from the foregoing fourth possible implementation of the first aspect that the intermediate status information of the faulty operator is backed up only when the cost reduced by continuing the execution is less than the sum of the cost required for backing up the operation completed by the faulty operator and the cost required for recovering the operation uncompleted by the faulty operator. In this way, the hardware resource can be fully saved.

With reference to the first aspect, or the first or the second possible implementation of the first aspect, in a fifth possible implementation, the step, in the first aspect, of updating operation symbols of the faulty operator and a logical relationship between the operation symbols according to the query plan tree and the intermediate status information of the faulty operator to obtain a reconstructed query plan tree includes recursively processing the uncompleted operation and the completed operation to obtain reconstructed information of the faulty operator, where the reconstructed information includes reconstructed operation symbols and a logical relationship between the reconstructed operation symbols, and updating, according to the reconstructed information, original information that is in the faulty operator of the query plan tree and that is corresponding to the reconstructed information to obtain the reconstructed query plan tree, where the original information includes original operation symbols and a logical relationship between the original operation symbols. It may be learned from the foregoing fifth possible implementation of the first aspect that reconstruction efficiency and accuracy can be improved by reconstructing a query plan tree by changing a logical relationship between operation symbols.

With reference to the fifth possible implementation of the first aspect, in a sixth possible implementation, the step, in the foregoing fifth possible implementation, of recursively processing the uncompleted operation and the completed operation to obtain reconstructed information of the faulty operator includes setting an end operation symbol for the completed operation, and setting, in the uncompleted operation, a start operation symbol that is used to mark a start location of the uncompleted operation to obtain the reconstructed operation symbols and the logical relationship between the reconstructed operation symbols. It may be learned from the foregoing sixth possible implementation of the first aspect that reconstruction efficiency and accuracy can be improved by reconstructing a query plan tree by changing a logical relationship between operation symbols.

With reference to the third possible implementation of the first aspect, in a seventh possible implementation, the query fault processing method further includes recording the query statement when the cost reduced by continuing the execution is less than the sum of the required costs, where the query statement is used for regenerating the query plan tree after the query fault is recovered. It may be learned from the foregoing seventh possible implementation of the first aspect that when the cost is not reduced, the query statement is directly recorded to avoid unnecessary resource consumption.

With reference to the fourth possible implementation of the first aspect, in an eighth possible implementation, the query fault processing method further includes recording the query statement when the cost of continuing the execution is greater than the sum of the required costs, where the query statement is used for regenerating the query plan tree after the query fault is recovered. It may be learned from the foregoing eighth possible implementation of the first aspect that when the cost is not reduced, the query statement is directly recorded to avoid unnecessary resource consumption.

With reference to the first aspect, or the first, the second or the third possible implementation of the first aspect, in a ninth possible implementation, the query fault processing method further includes recording the query statement when a fault occurs during generation of the query plan tree, where the query statement is used for regenerating the query plan tree after the query fault is recovered. It may be learned from the foregoing ninth possible implementation of the first aspect that when a query fault occurs at a stage of generating the query plan tree, the query statement is directly recorded to avoid unnecessary resource consumption.

A second aspect of this application provides a query fault processing apparatus. The processing apparatus is configured to implement the method provided in the foregoing first aspect or any optional implementation of the first aspect. The method is implemented by hardware/software, and the hardware/software includes a unit corresponding to the foregoing function.

A third aspect of this application provides a query fault processing apparatus that includes a transceiver, a processor, and a storage. The storage is configured to back up intermediate status information of a faulty operator. The transceiver is configured to receive a query statement. The processor is configured to perform the following steps of generating a query plan tree corresponding to the query statement, where the query plan tree includes multiple layers of operators that are in a pipeline relationship, each layer includes at least one operator, and each operator includes operation symbols and a logical relationship between the operation symbols, executing the query statement according to the query plan tree, extracting the intermediate status information of the faulty operator when a fault occurs in a process of executing the query statement, where the intermediate status information is backed up at a backup time point before the execution fault occurs, the intermediate status information indicates an operation completed by the faulty operator and an operation uncompleted by the faulty operator at the backup time point, and the faulty operator is an operator that is executing the query statement when the execution fault occurs, updating operation symbols of the faulty operator and a logical relationship between the operation symbols according to the query plan tree and the intermediate status information of the faulty operator, to obtain a reconstructed query plan tree, and continuing to execute the query statement according to the reconstructed query plan tree after the fault is recovered, to obtain a query result of the query statement. It may be learned from the foregoing description that reconstruction of the query plan tree using the intermediate status information of the faulty operator can ensure that execution of a current query statement can be continued after a database system fault is recovered such that impact exerted on an entire query process by query interruption is reduced. It may be learned from the foregoing third aspect that the reconstruction of the query plan tree using the intermediate status information of the faulty operator can ensure that the execution of the current query statement can be continued after the database system fault is recovered such that the impact exerted on the entire query process by the query interruption is reduced.

With reference to the third aspect, in a first possible implementation, the processor in the query fault processing apparatus is further configured to selectively back up the intermediate status information of the faulty operator based on a backup cost of an intermediate status of the faulty operator. It may be learned from the foregoing first possible implementation of the third aspect that whether the intermediate status information of the faulty operator is backed up is determined based on the backup cost, and the intermediate status information of the faulty operator is backed up only when the cost is low. In this way, not only operation execution can be continued, but also a hardware resource can be saved.

With reference to the first possible implementation of the third aspect, in a second possible implementation, the processor is further configured to periodically perform the step of selective backup.

With reference to the first or the second possible implementation of the third aspect, in a third possible implementation, the processor is further configured to back up the intermediate status information of the faulty operator when a cost reduced by a continuing to execute the faulty operator is greater than a sum of a cost required for backing up the operation completed by the faulty operator and a cost required for recovering the operation uncompleted by the faulty operator. It may be learned from the foregoing third possible implementation of the third aspect that the intermediate status information of the faulty operator is backed up only when the cost reduced by continuing the execution is greater than the sum of the cost required for backing up the operation completed by the faulty operator and the cost required for recovering the operation uncompleted by the faulty operator. In this way, the hardware resource can be fully saved.

With reference to the first or the second possible implementation of the third aspect, in a fourth possible implementation, the processor is further configured to back up the intermediate status information of the faulty operator when a cost of continuing to execute the faulty operator is less than a sum of a cost required for backing up the operation completed by the faulty operator and a cost required for recovering the operation uncompleted by the faulty operator. It may be learned from the foregoing fourth possible implementation of the third aspect that the intermediate status information of the faulty operator is backed up only when the cost of continuing the execution is less than the sum of the cost required for backing up the operation completed by the faulty operator and the cost required for recovering the operation uncompleted by the faulty operator. In this way, the hardware resource can be fully saved.

With reference to the third aspect, or the first or the second possible implementation of the third aspect, in a fifth possible implementation, the processor is further configured to recursively process the uncompleted operation and the completed operation to obtain reconstructed information of the faulty operator, where the reconstructed information includes reconstructed operation symbols and a logical relationship between the reconstructed operation symbols, and update, according to the reconstructed information, original information that is in the faulty operator of the query plan tree and that is corresponding to the reconstructed information, to obtain the reconstructed query plan tree, where the original information includes original operation symbols and a logical relationship between the original operation symbols. It may be learned from the foregoing fifth possible implementation of the third aspect that reconstruction efficiency and accuracy can be improved by reconstructing a query plan tree by changing a logical relationship between operation symbols.

With reference to the fifth possible implementation of the third aspect, in a sixth possible implementation, the processor is further configured to set an end operation symbol for the completed operation, and set, in the uncompleted operation, a start operation symbol that is used to mark a start location of the uncompleted operation, to obtain the reconstructed operation symbols and the logical relationship between the reconstructed operation symbols. It may be learned from the foregoing sixth possible implementation of the third aspect that reconstruction efficiency and accuracy can be improved by reconstructing a query plan tree by changing a logical relationship between operation symbols.

With reference to the third possible implementation of the third aspect, in a seventh possible implementation, the processor is further configured to record the query statement when the cost reduced by continuing the execution is less than the sum of the required costs, and the query statement is used for regenerating the query plan tree after the query fault is recovered. It may be learned from the foregoing seventh possible implementation of the third aspect that when the cost is not reduced, the query statement is directly recorded to avoid unnecessary resource consumption.

With reference to the fourth possible implementation of the third aspect, in an eighth possible implementation, the processor is further configured to record the query statement when the cost of continuing the execution is greater than the sum of the required costs, and the query statement is used for regenerating the query plan tree after the query fault is recovered. It may be learned from the foregoing eighth possible implementation of the third aspect that when the cost is not reduced, the query statement is directly recorded to avoid unnecessary resource consumption.

With reference to the third aspect, the first, or the second or the third possible implementation of the third aspect, in a ninth possible implementation, the processor is further configured to record the query statement when a fault occurs during generation of the query plan tree, and the query statement is used for regenerating the query plan tree after the query fault is recovered. It may be learned from the foregoing ninth possible implementation of the third aspect that when a query fault occurs at a stage of generating the query plan tree, the query statement is directly recorded to avoid unnecessary resource consumption.

A fourth aspect of this application provides a computer storage medium, and the computer storage medium stores a query fault processing program in the foregoing first aspect or any optional implementation of the first aspect.

A fifth aspect of this application provides a database management system that includes a query fault processing apparatus and an external storage apparatus, and the query fault processing apparatus is a processing apparatus in the foregoing second aspect or the third aspect.

BRIEF DESCRIPTION OF DRAWINGS

To describe the technical solutions in some of the embodiments of the present disclosure more clearly, the following briefly describes the accompanying drawings describing some of the embodiments.

DESCRIPTION OF EMBODIMENTS

Embodiments of this application provide a query fault processing method, to ensure that execution of a current query statement can be continued after a fault is recovered, and to reduce query time. The embodiments of this application further provide a corresponding apparatus. Details are separately illustrated below.

Figure 1:
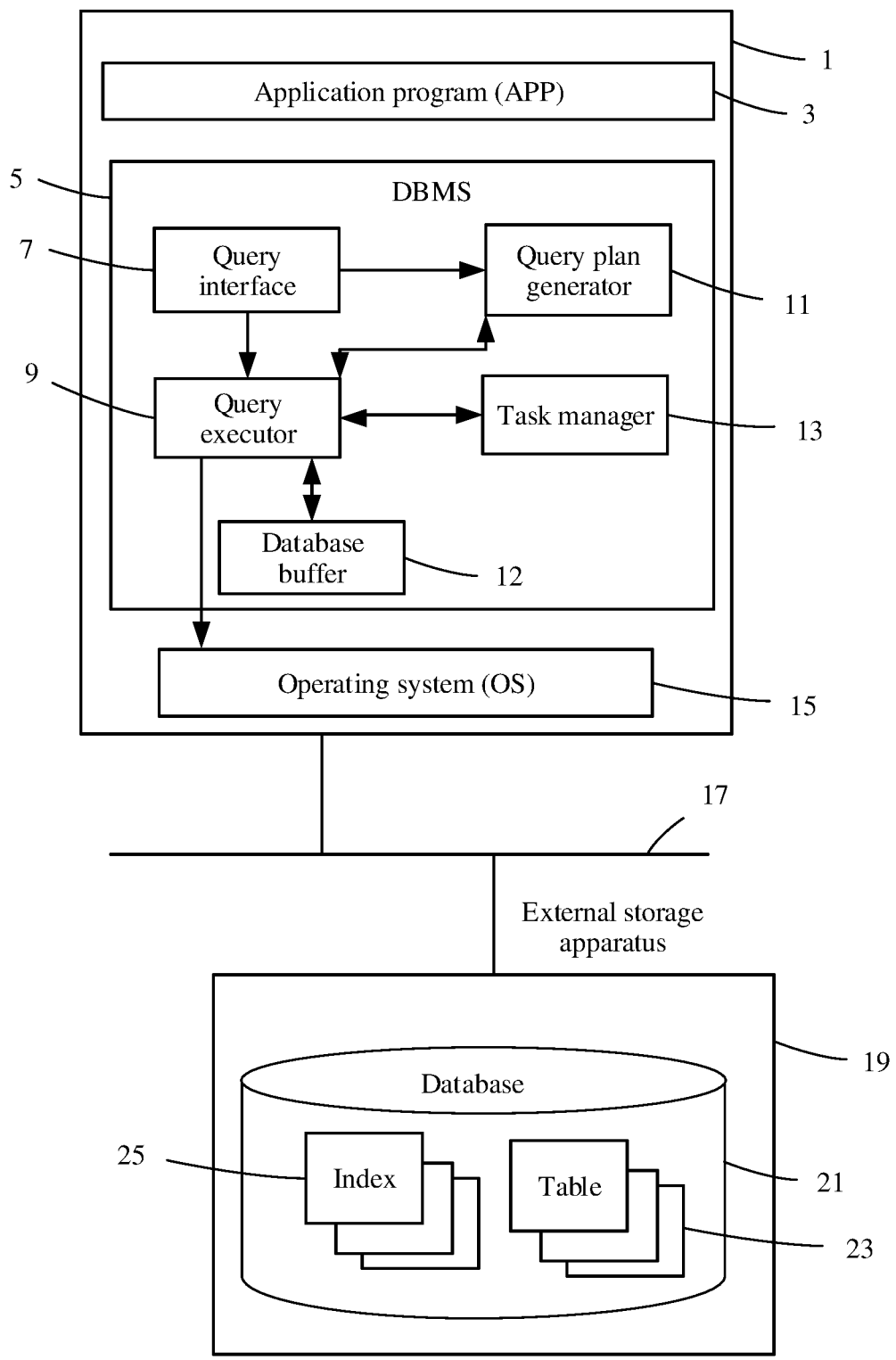
FIG. 1 is a schematic structural diagram of a hardware environment of a database management system according to an embodiment of this application.

A query fault processing method according to an embodiment of this application may be implemented in a database server 1 shown in FIG. 1. The database server 1 has a storage such as a memory and a hard disk, and is configured to store data and a computer executable program. The database server 1 further includes at least one processor, such as a central processing unit (CPU) that can read the computer executable program from the storage and execute the program. An operating system (OS) 15, a DBMS 5, and an application program (APP) 3 run on the database server 1. The OS 15, the DBMS 5, and the APP 3 may be stored in the storage in a form of executable code, and implement corresponding functions after the code is executed by the processor. The APP 3 generates a query statement according to a user operation or triggering of a system. The query statement may be a structured query language (SQL) statement or the like. The database management system 5 is configured to receive the query statement from the APP 3, execute the query statement, and return a query result to the APP 3 and the OS 15. The OS 15 may be LINUX or the like. The OS 15 is configured to manage hardware and software resources of the database server 1, and provide interfaces to the DBMS 5 and the APP 3 that are at upper layers. The DBMS 5 and the APP 3 may invoke corresponding hardware resources using the interfaces.

Further, as shown in FIG. 1, the database server 1 is in communication connection with an external storage apparatus 19 using a communications network 17.

Figure 2A:
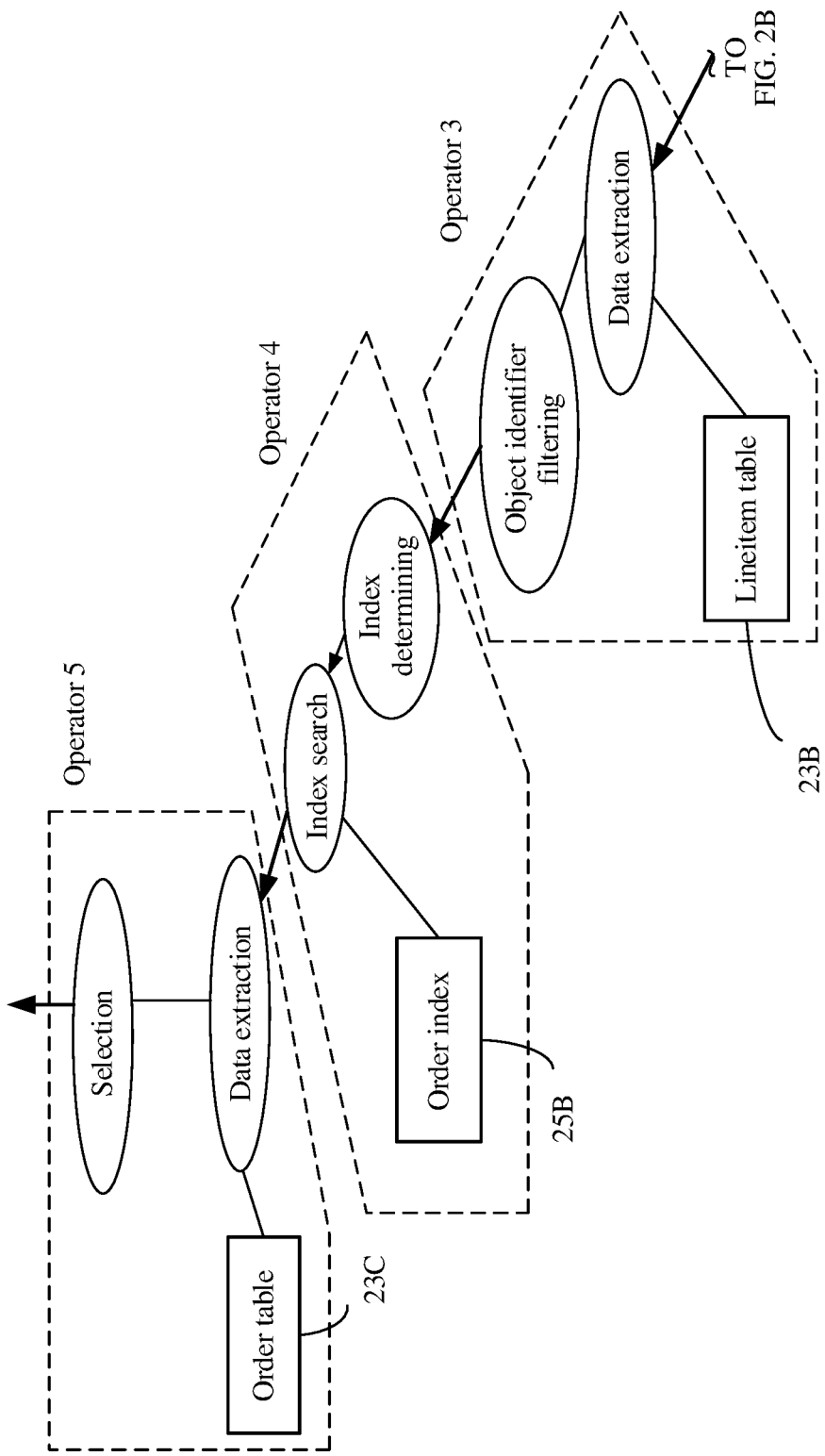
FIG. 2A and FIG. 2B are a schematic diagram of an example of a query plan tree according to an embodiment of this application.
Figure 2B:
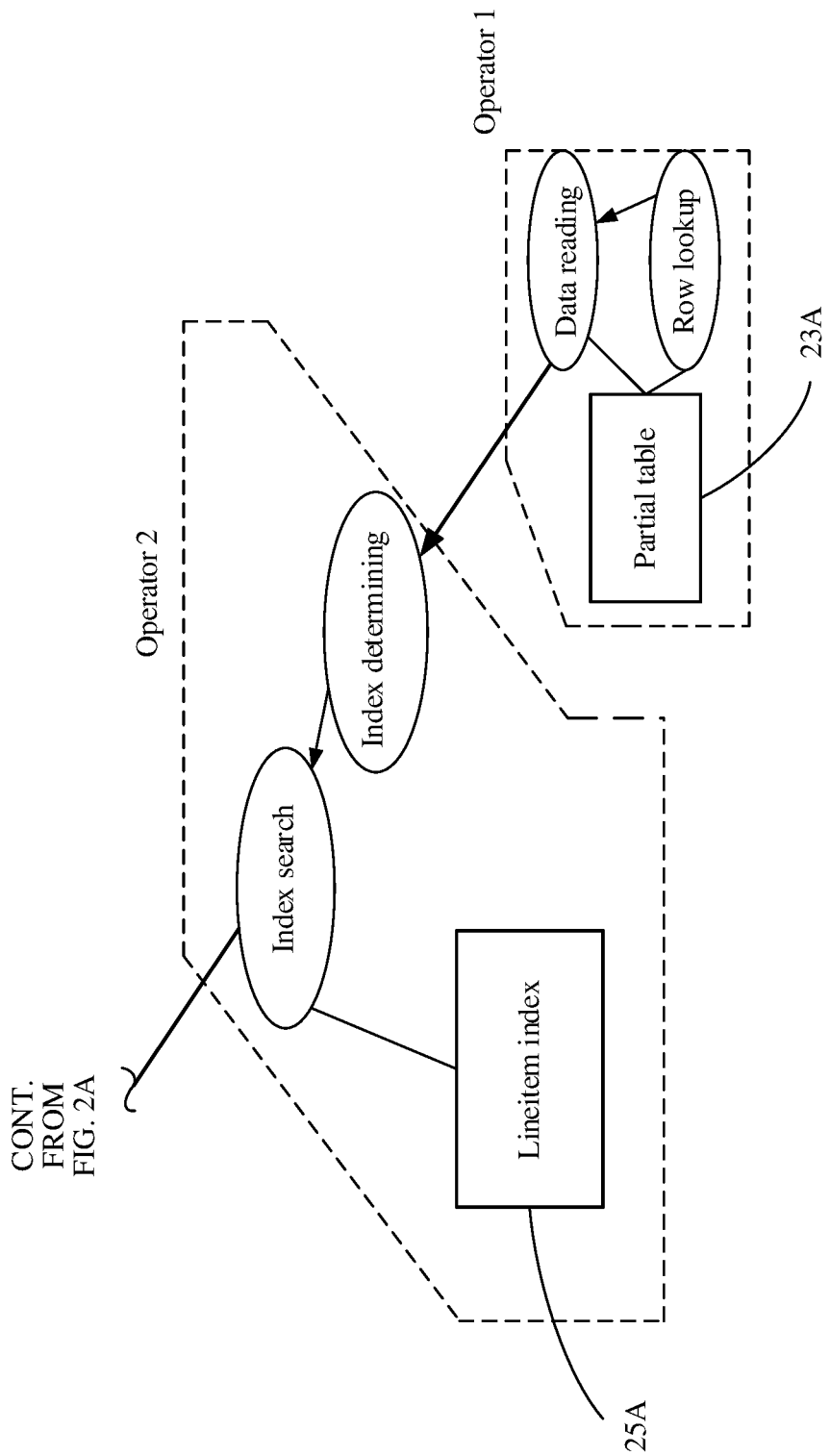
Figure 2C:
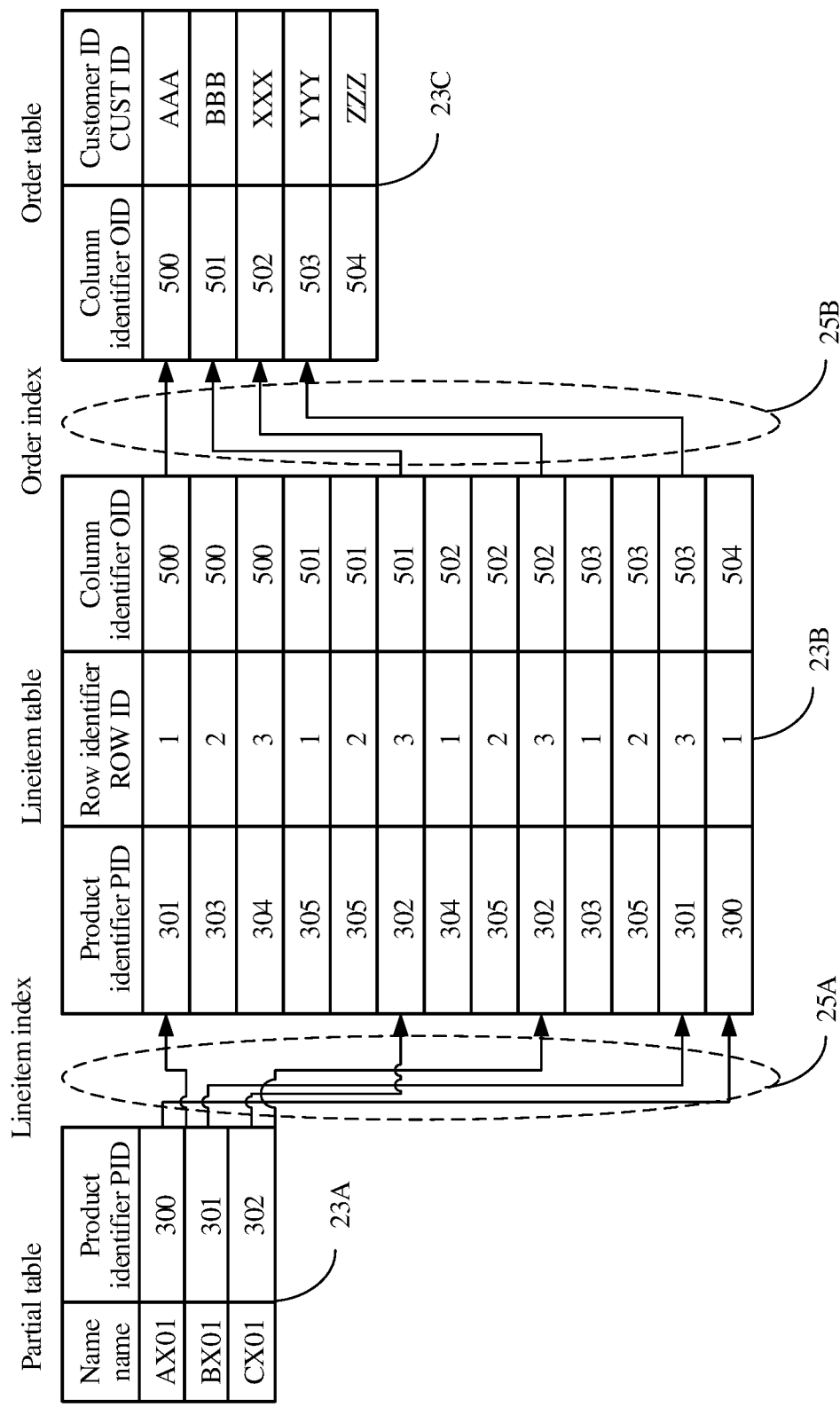
FIG. 2C is a schematic diagram of an example of a database operation with reference to a data table according to an embodiment of this application.

The external storage apparatus 19 may be any apparatus that has a storage resource. For example, the external storage apparatus 19 may be a file server, a single disk drive (for example, a hard disk drive), or a storage system that has multiple disk drives. A database 21 in the external storage apparatus 19 can store multiple indexes 25 and multiple tables 23. Data of each index 25 includes, for example, a lineitem index 25A and an order index 25B that are shown in FIG. 2A and FIG. 2B and FIG. 2C. Data of each table 23 includes, for example, a partial table 23A, a lineitem table 23B, and an order table 23C that are shown in FIGS. 2A, 2B, and 2C. Each table includes multiple rows, and each row includes multiple row elements. An index is used for establishing a connection between one table and another table. For example, the lineitem index 25A shown in FIG. 2C is used for establishing a connection between the partial table 23A and the lineitem table 23B, and the order index 25B is used for establishing a connection between the lineitem table 23B and the order table 23C.

As shown in FIG. 1, the DBMS 5 includes a query interface 7, a query plan generator 11, a query executor 9, a task manager 13, and a database buffer (also referred to as DB buffer) 12. The query interface 7 is configured to receive the query statement from the APP 3, and the query plan generator 11 is configured to generate a query plan tree shown in FIG. 2A and FIG. 2B. The query executor 9 is configured to execute the query statement according to the query plan tree. The task manager 13 is configured to manage the query statement. The DB buffer 12 is a storage resource and can buffer data required by the query executor 9 for executing a task.

Data in FIG. 2A, FIG. 2B and FIG. 2C is used as an example below to describe a process in which the DBMS 5 executes a query statement and outputs a query result shown in FIG. 2D.

The DBMS 5 receives a query statement from an application program (for example, an APP 3) and generates a query plan tree shown in FIG. 2A and FIG. 2B. As shown in FIG. 2A and FIG. 2B, the query plan tree includes five layers of operators that are in a pipeline relationship, which are respectively an operator 1, an operator 2, an operator 3, an operator 4, and an operator 5 from a bottommost layer to an uppermost layer, to indicate that the five layers of operators are sequentially executed in a pipeline manner. In an example shown in FIG. 2A and FIG. 2B, each layer of operator includes one operator, but this example is only a particular case. Actually, in different example scenarios, each layer of operator may include one or more operators. In an embodiment of this application, operation logic at each layer of the query plan tree is described using one or more operators. In another scenario, operation logic of the query plan tree may be described using an operation (also referred to as OP), or may be described using a node. However, regardless of a description manner, no limitation should be imposed on understanding of this embodiment of this application. Further, a single operation symbol usually has no logical meaning, and therefore, an operator usually includes multiple operation symbols and a logical relationship between the operation symbols. The operator 3 is used as an example. The operator 3 includes a data extraction operation, an object identifier filtering operation, and a logical relationship between a data extraction operation and an object identifier filtering operation. The data extraction operation and the object identifier filtering operation each need to include multiple operation symbols and a logical relationship between the operation symbols. The operator 1 includes a row lookup operation, a data read operation, and a logical relationship between a row lookup operation and a data read operation. In addition, the row lookup operation and the data read operation each may need to include multiple operation symbols and a logical relationship between the operation symbols. In FIG. 2A and FIG. 2B, the operator 1 includes one partial table 23A, the operator 3 includes one lineitem table 23B, the operator 5 includes one order table 23C, the operator 2 includes one lineitem index 25A, and the operator 4 includes one order index 25B. Examples of the partial table 23A, the lineitem table 23B, and the order table 23C are shown in FIG. 2C. The lineitem index 25A and the order index 25B may be stored in, for example, an external storage apparatus 19 shown in FIG. 1.

According to the query plan tree shown in FIG. 2A and FIG. 2B, the operator 1 to the operator 5 shown in FIG. 2A and FIG. 2B are sequentially executed by a query executor 9 until all rows of the partial table 23A are read.

With reference to the operators in FIG. 2A and FIG. 2B and FIG. 2C, in a process of executing the operator 1, a row that needs to be read is locked by means of row lookup, and then the row is read from the partial table 23A. For example, the second row is read, a name is BX01, and a product identifier PID=301. In a process of executing the operator 2, an index PID is determined from row data that is output from the operator 1. For example, PID=301. Then, a corresponding row in the lineitem table is indexed using an operation of the lineitem index 25A. In a process of executing the operator 3, the lineitem table 23B is searched for corresponding data using the index PID. When the second row is read during execution of the operator 1, the index PID=301 is determined during execution of the operator 2, a corresponding row in which PID=301 is read from the lineitem table 23B during execution of the operator 3, and then filtering is performed using an object identifier (also referred to as OID). For example, only a row in which an OID is less than 504 is output. In the lineitem table 23B, there are two rows in which PID=301, and corresponding OIDs are respectively 500 and 503. Therefore, both the two rows can be output. Executing the operator 4 is to perform an order index operation, that is, to determine an index OID according to the row determined during execution of the operator 3. For example, according to the foregoing description, determined indexes are OID=500 and OID=503, and then corresponding rows in the order table are indexed using the index OIDs. In a process of executing the operator 5, a corresponding OID in the order table 23C is searched for using the OID to find a corresponding row in the order table 23C. Two corresponding rows of data in the order table 23C may be determined using OID=500 and OID=503.

Figures 2D, 3:
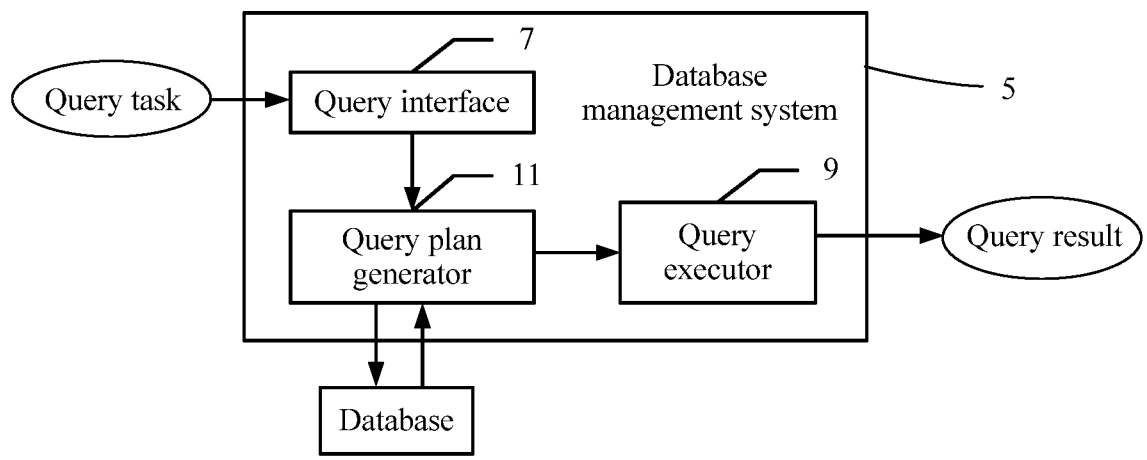
FIG. 2D shows a query result in an example scenario according to an embodiment of this application.
FIG. 3 is a simplified diagram of a database management system.

After the foregoing operations are performed, the operator 1 may be executed again, a next row in the partial table is read, then corresponding operations of the operator 1 to the operator 5 are sequentially performed until all rows of the partial table are read, and finally, a query result shown in FIG. 2D is output.

In the embodiment of FIG. 2A and FIG. 2B to FIG. 2D, the query executor 9 executes a task of an operator. If data of the external storage apparatus 19 needs to be read during execution of the task, the query executor 9 reads the data and executes the task of the operator.

Figure 4:
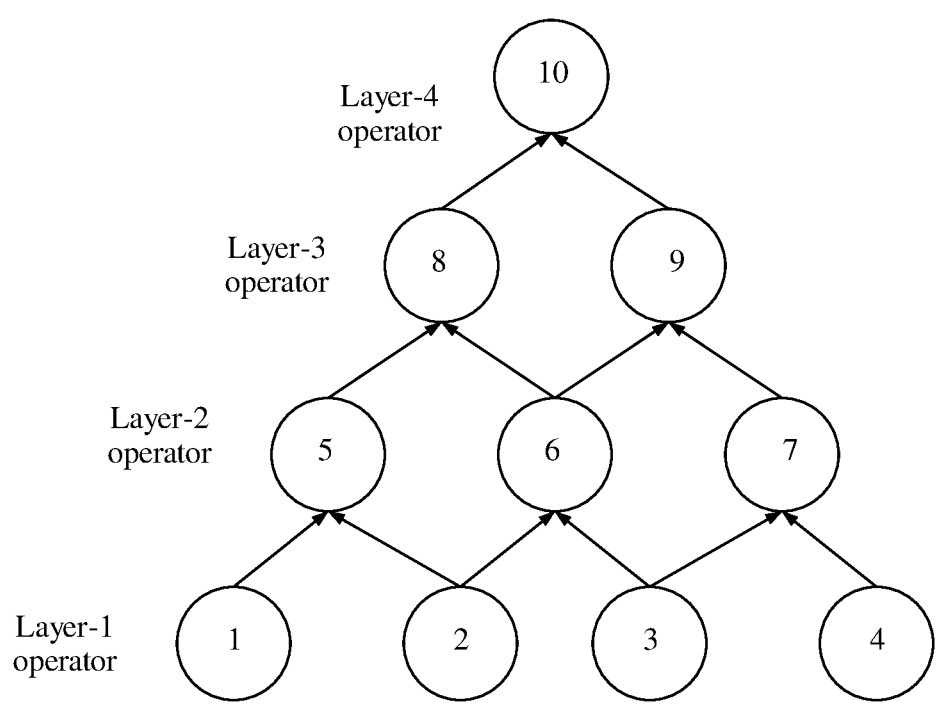
FIG. 4 is a schematic diagram of a representation form of a query plan tree according to an embodiment of this application.

FIG. 3 and FIG. 4 are used as an example below to describe a process of executing a query statement by a database management system in a normal status. Only some key modules are shown in a database management system 5 shown in FIG. 3, and functions of other modules that are not shown may be understood with reference to FIG. 1.

As shown in FIG. 3, the database management system 5 may include a query interface 7, a query plan generator 11, and a query executor 9. After the query interface 7 receives a query statement, the query plan generator 11 generates a query plan tree according to the obtained query statement. The query plan tree includes multiple layers of operators that are in a pipeline relationship, the layers of operators are sequentially executed in a pipeline manner, and input of an upper-layer operator depends on output of an adjacent lower-layer operator that is in a direct flow direction relationship with the upper-layer operator.

The query statement may be an SQL statement. It should be noted that some query statements with relatively high complexity and relatively long query execution time are collectively referred to as large queries in all embodiments of this application, such as a large select query, data redistribution, and a large update query. The query statement corresponds to a query task, the query task is generally a user-oriented expression manner, and the query statement is a machine language corresponding to the query task.

The query plan tree may further be understood with reference to a representation manner in FIG. 4. A layer-1 operator is an operator at a bottommost layer, input of a layer-2 operator depends on output of the layer-1 operator, input of a layer-3 operator depends on output of the layer-2 operator, and input of a layer-4 operator depends on output of the layer-3 operator. In an example shown in FIG. 4, the layer-4 operator is an operator at an uppermost layer. An operator 1 and an operator 2 at a layer 1 are in a direct flow direction relationship with an operator 5 at a layer 2, the operator 5 and an operator 6 at the layer 2 are in a direct flow direction relationship with an operator 8 at a layer 3, and the operator 8 and an operator 9 at the layer 3 are in a direct flow direction relationship with an operator 10 at a layer 4. A flow direction relationship between other operators may be understood with reference to FIG. 4 and the foregoing example descriptions, and details are not described herein one by one.

FIG. 4 shows only one expression manner of a query plan tree. Actually, the query plan tree may have multiple expression manners, and FIG. 4 should not be understood as a limitation on the expression manner of the query plan tree.

The query executor 9 sequentially completes functions of operators according to the query plan tree generated by the query plan generator 11, and finally completes the query statement to obtain a query result, and feeds the query result back to a user.

A normal process of executing a query statement is described in the foregoing embodiment. Actually, for a query service in a database management system, especially a large query service, multiple operators cooperate with each other to work in a pipeline in an entire query process, and output of an upper-layer operator is generated only when there is input from a lower-layer operator. Therefore, when a query is interrupted in an operator, it is likely that some services of the operator have been completed. Although the operator is faulty, a lower-layer operator is still performing input continuously. Consequently, data that is input by the lower-layer operator after the fault is lost and cannot be traced, and it is difficult to continue operation execution according to a status during interruption. The continuing operation execution is to continue to complete a subsequent query statement from a location of a query that has been completed before query interruption. If operation execution cannot be continued for a query statement after a fault is recovered, the query statement can be completed only by means of operation re-execution. The operation re-execution inevitably increases time of a query operation, and therefore, a key to resolving such a problem is whether execution of this large query can be continued using completed work.

The database management system may execute a query service in a non-pipeline query manner and a pipeline query manner according to different system types. Both an Oracle system and an SQL server system belong to the pipeline query manner.

A database such as Oracle and an SQL server executes a query statement in a pipeline manner. That is, output of an upper-layer operator depends on input of a lower-layer operator. For a pipeline execution manner, it is difficult to store status information of each operator at all moments. Therefore, because of a difference in such an execution manner, a problem that execution of a query cannot be continued cannot be resolved in a pipeline system such as the Oracle and the SQL server.

In this embodiment of this application, moments at which a fault occurs mainly include two types.

The first type is that a fault occurs in an execution process of the query executor 9.

The second type is that a fault occurs when the query plan generator 11 generates the query plan tree, and in this case, the query plan tree may have already been generated.

A query fault processing method used for a fault that occurs when the query executor 9 performs a function of each operator in this embodiment of this application is described below with reference to FIG. 5 for the first type of moment at which a fault occurs.

Figure 5:
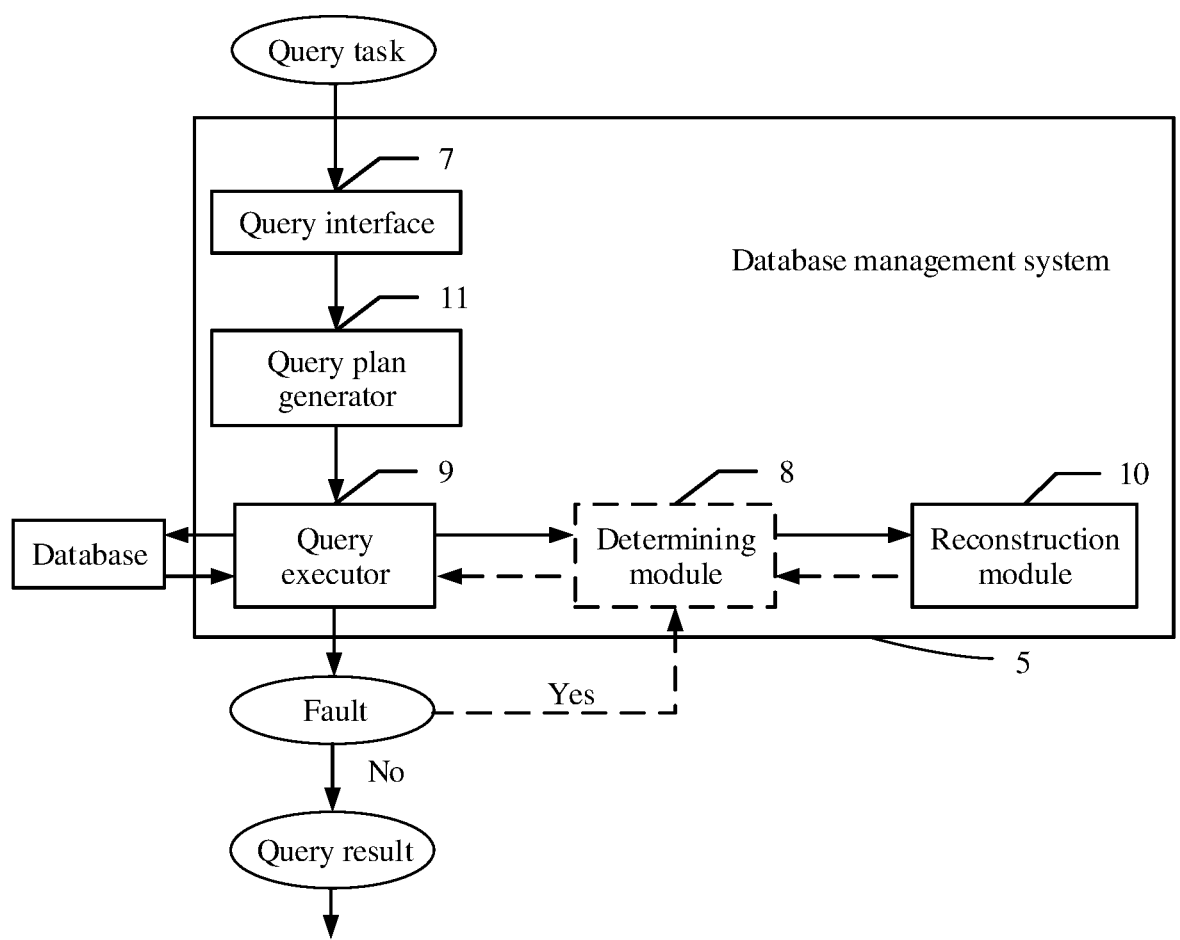
FIG. 5 is a schematic diagram of an embodiment of a query fault processing process according to an embodiment of this application.

FIG. 5 is a schematic diagram of an embodiment of a query fault processing method. A database management system 5 shown in FIG. 5 is a simplified diagram in which only some key modules are drawn, and functions of other modules that are not shown may be understood with reference to FIG. 1.

As shown in FIG. 5, a database management system 5 may include a query interface 7, a query plan generator 11, a query executor 9, a determining module 8, and a reconstruction module 10.

After receiving a query statement, the query interface 7 transfers the query statement to the query plan generator 11, and the query plan generator 11 generates a query plan tree according to the query statement. The query plan tree includes multiple layers of operators that are in a pipeline relationship. That is, input of an upper-layer operator depends on output of an adjacent lower-layer operator that is in a direct flow direction relationship with the upper-layer operator. Each layer includes at least one operator, and each operator includes logical operation symbols and a logical relationship between the operation symbols. The query plan tree may be understood with reference to an expression manner in FIG. 4.

The query executor 9 obtains data from a database according to the query plan tree generated by the query plan generator 11, to sequentially complete functions of operators. In a process of performing the functions of the operators, the query executor 9 periodically backs up intermediate status information of each operator to the database such that no intermediate status information is lost when the database management system is faulty.

When a function of an operator is being performed, intermediate status information of the operator is backed up at a backup time point, and the intermediate status information includes a completed operation and an uncompleted operation in the operator during storage. The backup may be periodic backup.

When a query fault occurs in a process of performing the function of the operator, the operator becomes a faulty operator. That is, a query fault occurs in the faulty operator in the multiple layers of operators during execution of the query statement, and the intermediate status information of the faulty operator is extracted. The intermediate status information is backed up at a backup time point before the execution fault occurs, the intermediate status information indicates an operation completed by the faulty operator and an operation uncompleted by the faulty operator at the backup time point, and the faulty operator is an operator that is executing the query statement when the execution fault occurs.

For example, during execution of an operator 5 shown in FIG. 4, intermediate status information of the operator 5 may be backed up. When a query fault occurs before execution of the operator 5 is completed, the intermediate status information, backed up at a backup time point before the fault occurs, of the operator 5 may be extracted, and the intermediate status information includes a completed operation and an uncompleted operation in the operator 5 at the backup time point.

In this embodiment of this application, the query executor 9 periodically backs up the intermediate status information of the faulty operator. Then, the reconstruction module 10 updates operation symbols of the faulty operator and a logical relationship between the operation symbols according to the query plan tree and the intermediate status information of the faulty operator, to obtain a reconstructed query plan tree.

After the fault is recovered, execution of the query statement is continued according to the reconstructed query plan tree to obtain a query result of the query statement.

According to the query fault processing method, when a fault occurs, a query plan tree may be reconstructed according to intermediate status information of a faulty operator, and after the fault is recovered, execution of a query statement may be continued according to the reconstructed query plan tree, that is, the execution of the current query statement is continued from a location at which the fault occurs. Therefore, query time is reduced.

Further, it is found from tests that benefits are not always generated when intermediate status information of an operator is saved. Therefore, a cost determining solution is further proposed in this embodiment of this application. That is, for each operator that is being executed, intermediate status information of the operator is selectively backed up based on a backup cost of an intermediate status of the operator.

It may be understood that the cost determining solution is executed by the determining module 8 in FIG. 5, that is, when the backup time point arrives in a process in which the query executor 9 performs the function of the operator, the determining module 8 determines whether a cost reduced by continuing to execute the faulty operator is greater than a sum of a cost required for backing up the operation completed by the faulty operator and a cost required for recovering the operation uncompleted by the faulty operator, and backs up the intermediate status information of the faulty operator when determining that the cost reduced by continuing to execute the faulty operator is greater than the sum of the cost required for backing up the operation completed by the faulty operator and the cost required for recovering the operation uncompleted by the faulty operator. In addition, the determining module 8 may determine whether a cost of continuing to execute the faulty operator is less than a sum of a cost required for backing up the operation completed by the faulty operator and a cost required for recovering the operation uncompleted by the faulty operator, and backs up the intermediate status information of the faulty operator when the cost of the continuing to execute the faulty operator is less than the sum of the cost required for backing up the operation completed by the faulty operator and the cost of recovering the operation uncompleted by the faulty operator. In this way, after the determining module 8 performs determining, the intermediate status information is backed up, and the query plan tree is reconstructed to obtain the reconstructed query plan tree. Therefore, not only operation execution can be continued and query time can be reduced, but also a hardware resource can be saved.

The cost described in this embodiment of this application may be understood as a resource consumption amount. For example, a processor cost is processor occupation amount, and a page read cost is a quantity of resources consumed for reading a service.

The query fault described in this embodiment of this application may include an execution node fault, a machine fault, an abnormal network disconnection, or the like.

When the determining module 8 determines that the cost reduced by continuing the execution is less than the sum of the required costs, the query statement is recorded, and the query statement is used for regenerating the query plan tree after the query fault is recovered.

Alternatively, when the determining module 8 determines that the cost of continuing the execution is greater than the sum of the required costs, the query statement is recorded, and the query statement is used for regenerating the query plan tree after the query fault is recovered.

A key technology to complete the foregoing core idea is to back up intermediate status information based on a cost using a pipeline execution framework. For detailed cost estimation, cost calculation of operation symbol-level isolation is first used for the operator. For example, when the operator 5 is a hash join operator, the hash join operator includes two parts of operations The first part is to perform a build operation on an obtained right table, and the second part is to perform a probe operation on an obtained left table. In this way, a cost corresponding to each operation symbol needs to be obtained. In addition, a cost required for saving a current status may be calculated with reference to a basic cost provided when the query plan generator 11 generates the query plan tree, such as, a CPU cost and a page read cost. The cost required for the saving is mainly a cost required for a write status. Further, a cost reduced by continuing to execute the current faulty operator is estimated according to a current execution status. After obtaining these basic costs, it may be determined whether to perform saving. When the cost reduced by continuing the execution is greater than a cost consumed for saving and recovering the execution, all statuses of operators used in the current query plan tree are backed up. When the cost reduced by continuing the execution is less than the cost consumed for saving and recovering, no saving processing is performed, and in this case, a query result is directly obtained according to the query statement after a cluster is recovered. In an embodiment, cost-based determining may be invoked in two manners periodical evaluation or voluntary determining using an operation symbol.

Optionally, updating the operation symbols of the faulty operator and a logical relationship between the operation symbols according to the query plan tree and the intermediate status information of the faulty operator to obtain a reconstructed query plan tree may include recursively processing the uncompleted operation and the completed operation to obtain reconstructed information of the faulty operator, where the reconstructed information includes reconstructed operation symbols and a logical relationship between the reconstructed operation symbols, and updating, according to the reconstructed information, original information that is in the faulty operator of the query plan tree and that is corresponding to the reconstructed information to obtain the reconstructed query plan tree, where the original information includes original operation symbols and a logical relationship between the original operation symbols.

The recursively processing the uncompleted operation and the completed operation to obtain reconstructed information of the faulty operator includes setting an end operation symbol for the completed operation, and setting, in the uncompleted operation, a start operation symbol that is used to mark a start location of the uncompleted operation to obtain the reconstructed operation symbols and the logical relationship between the reconstructed operation symbols.

In this embodiment of this application, after the intermediate status information of the operator is backed up, a key point is that the query plan tree needs to be reconstructed according to the query plan tree and the intermediate status information of the operator to obtain the reconstructed query plan tree. A specific reconstruction process may be as follows.

The operation uncompleted and completed by the faulty operator are determined according to the intermediate status information of the faulty operator. The operation uncompleted by the faulty operator may be defined as a left subtree, and the operation completed by the faulty operator may be defined as a right subtree.

A completed operation in the backed-up faulty operator is marked as a saved state, that is, the end operation symbol is set, and the completed operation is used as the right subtree of the current operator for subsequent scanning. In addition, some subsequent operations are required, and therefore, "UNION ALL" needs to be added to an upper layer of the current operator, the uncompleted operation needs to be used as the left subtree, and the start operation symbol that is used to mark the start location of the uncompleted operation needs to be set in the uncompleted operation. Then, the left subtree and the right subtree of the current operator are recursively processed.

Herein, that the right subtree is the completed operation and the left subtree is the uncompleted operation is merely an example for description. Actually, the right subtree may be the uncompleted operation, and the left subtree may be the completed operation.

When the reconstructed query plan tree is obtained, an operation of continuing the execution is performed using the reconstructed query plan tree after the fault is recovered.

To illustrate technical points used in this embodiment of this application, an actual query statement is constructed below to illustrate a query execution process in this embodiment of this application. An SQL statement selected and used in an example of this embodiment of this application is "INSERT INTO C (C1, C2) SELECT A.col, B.col FROM A INNER JOIN B ON A.col=B.col GROUP BY 1, 2 LIMIT 100".

A key point of this embodiment of this application is to reconstruct the query plan tree. Therefore, a query plan tree generated according to the foregoing query statement needs to be obtained first. Regardless of a quantity of operators in the query plan tree, the operators are executed one by one in an execution process, and therefore, a structure of one operator in the query plan tree is used as an example for description below. A structure of one operator and a cost required for performing a corresponding operation in the operator are as follows:

```
INSERT (T)                              cost 200
  ->LIMIT (100)                         cost 10
    ->HashAgg                           cost 160
      ->HashJoin                        cost 60 (build) + 80 (probe)
        ->(probe) Scan (A)              cost 200
        ->(build) Scan (B)              cost 70
```

The cost on the right represents a cost required for performing a corresponding operation. HashJoin in the execution operation includes a build process and a probe process. Therefore, execution costs of operation symbols in these two parts need to be separately counted. When a fault scenario is that the hash join has begun to perform output, and it may be determined, according to intermediate status information that is of this operator and that is backed up at a backup time point, that a build operation has been completed and a part of a probe operation has not been completed. Therefore, a combination identifier "UNION ALL" that includes the completed operation and the uncompleted operation is added to an upper layer of the current hash join, and then the completed build operation is defined as a right subtree of the operator. An end operation symbol Scan (saved_B) may be set. Because a part of the probe operation has not been completed, a start operation symbol that is used to mark a start location of the uncompleted operation is set in the uncompleted operation, for example, scan (part of A) in the probe operation. The uncompleted part (probe) scan (part of A) in the probe operation is defined as a left subtree of the operator. For the left subtree, a current scan (A) operation is not finished, and therefore, only a scanned location needs to be recorded, and a subtree status does not need to be changed. For the right subtree, the build operation is actually finished. To ensure integrity, a virtual right subtree is added at an original location of the scan (B). For the original scan (B), because the build operation has actually been completed, a completed backup result is marked as saved_B and used as the right subtree. A cost required by each operation changes with update of the operation and a logical relationship between the operations. Therefore, obtained reconstructed information of the operator may be the following content.

```
->HashAgg                                cost 110
  ->UNION All                            cost 20
    ->HashJoin                           cost 90 (build) + 40 (probe)
      ->(probe) Scan (part of A)         cost 100
      ->(build) UNION All                cost 20
        ->Scan (B, EOF)                  cost 0
        ->Scan (saved B, 0)              cost 100
  ->Scan (saved HA, 0)                   cost 30
```

The reconstructed information is used for updating original information of the faulty operator, and a relationship between operations of the updated operator may be understood with reference to the following content.

```
INSERT (T)                                cost 200
  ->LIMIT (100)                           cost 10
    ->HashAgg                             cost 110
      ->UNION All                         cost 20
        ->HashJoin                        cost 90 (build) + 40 (probe)
          ->(probe) Scan (part of A)      cost 100
          ->(build) UNION All             cost 20
            ->Scan (B, EOF)               cost 0
            ->Scan (saved B, 0)           cost 100
      ->Scan (saved HA, 0)                cost 30
```

After the faulty operator is updated, the reconstructed query plan tree is obtained.

The reconstructed query plan tree generated according to the foregoing description is essentially consistent with the original query plan tree in terms of an execution meaning. This is also a key to ensuring that a query can be executed after a fault is recovered.

Evaluating a backup policy based on a cost in this embodiment of this application is described below with reference to the foregoing cost example. Similarly, the query plan generated based on the foregoing query statement is used as an initial cost. The following scenarios are considered.

When the build in the hash join is executed, it is assumed that execution of the scan (B) has consumed 30, a saving and recovering cost includes 40 required for recovering the hash join and 1 required for the scan (B), that is, 41 in total, and a reduced cost, that is, a part that has been executed is 30. In this case, the reduced cost is less than the saving and recovering cost. Saving is given up, and recalculation may be directly performed.

When the build in the hash join has already been completed, a saving and recovering cost includes a cost for saving the scan (B) and a cost for recovering the hash join, that is, 90 in total.

A reduced cost includes 70 consumed by the scan (B) and 60 consumed by the build operation, that is, 130 in total. The reduced cost is greater than the saving and recovering cost, and a hash table of the hash join is saved.

When the hash join has already been in an output state, and execution of the scan (A) has already consumed 100, a saving and recovering cost includes 30 required for saving a part of an output result of the hash join and 1 required for recovering the scan (A), that is, 31 in total. A reduced cost includes 100 of the scan (A) and 70 of the scan (B), that is, 170 in total. The reduced cost is greater than the saving and recovering cost, and a hash table of the hash join and a part of an output result of the hash join are saved.

By analogy, all results of previous saving are cleared when this time of evaluation is finished.

Because in a large query, execution of the query can be continued using a stored intermediate status after a query fault is recovered, it is ensured that execution of a service can be continued using a lower cost after an unpredictable fault occurs such that an entire service process is not affected by execution of the large query.

After a query fault processing process used for the foregoing first type of moment at which a fault occurs is described, a query fault processing process used for the second type of moment at which a fault occurs in this embodiment of this application is described below with reference to FIG. 6

Figure 6:
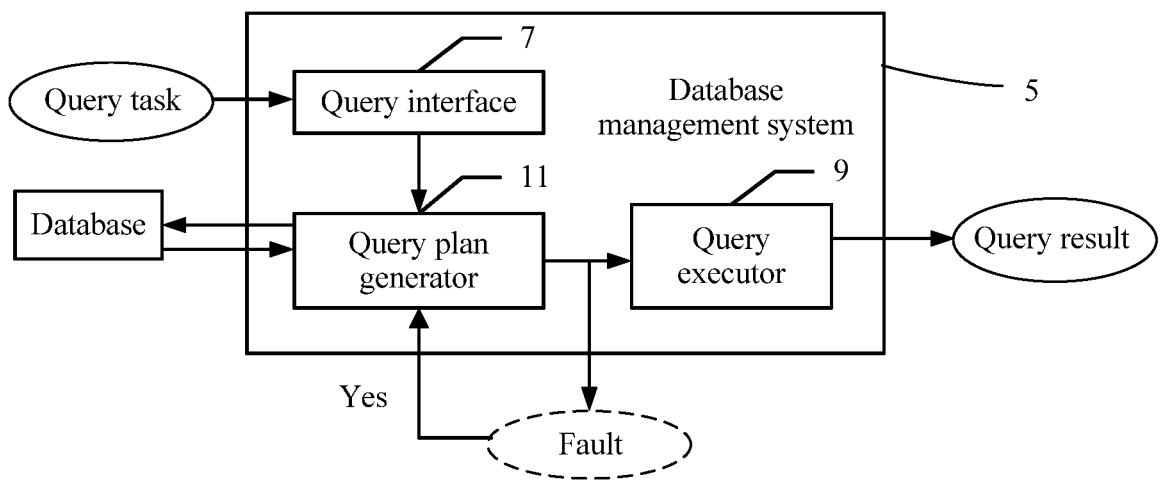
FIG. 6 is a schematic diagram of another embodiment of a query fault processing process according to an embodiment of this application.

FIG. 6 is a schematic diagram of another embodiment of a query fault processing method. A database management system 5 shown in FIG. 6 is a simplified diagram in which only some key modules are drawn, and functions of other modules that are not shown may be understood with reference to FIG. 1.

As shown in FIG. 6, a query management device may include a query interface 7, a query plan generator 11, and a query executor 9. After receiving a query statement, the query interface 7 transfers the query statement to the query plan generator 11, and the query plan generator 11 generates a query plan tree according to the obtained query statement. The query plan tree includes multiple layers of operators that are in a pipeline relationship, that is, input of an upper-layer operator depends on output of an adjacent lower-layer operator that is in a direct flow direction relationship with the upper-layer operator. Each operator includes a logical relationship between logical operations.

A query fault occurs when the query plan generator 11 generates the query plan tree. Time required by the query plan generator 11 to generate the query plan tree is less than time used by the query executor 9 to perform a function of an operator, and therefore, the query statement is still at an optimizer processing stage when the fault occurs, and the currently-executed query statement may be directly recorded without a need to save any intermediate status. After the query fault is recovered, the query statement may be re-parsed to generate an execution plan, and the execution plan is transferred to the query executor 9 to complete a final query statement.

Figure 7:
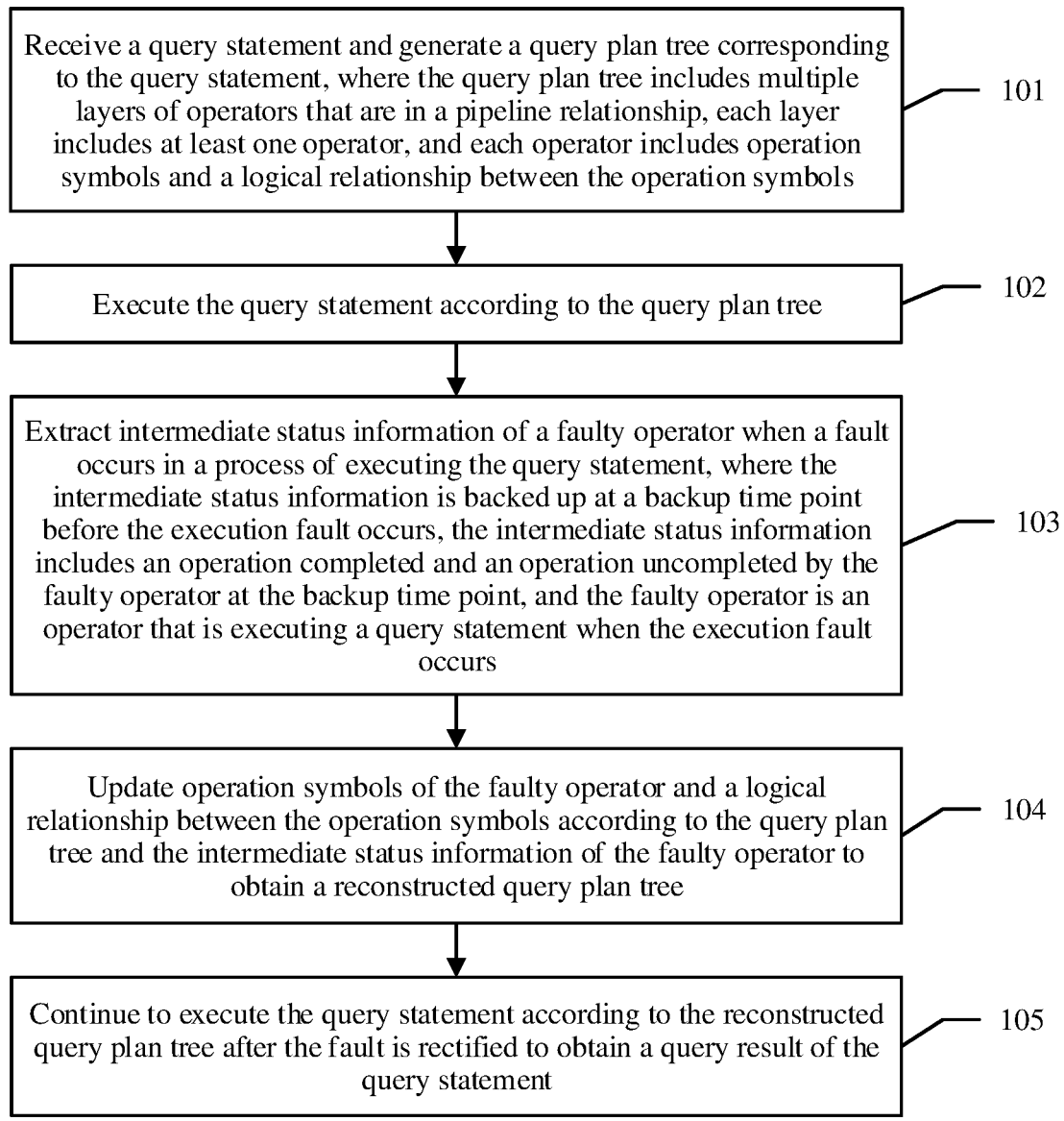
FIG. 7 is a schematic flowchart diagram of an embodiment of a query fault processing method according to an embodiment of this application.

Referring to FIG. 7, an embodiment of a query fault processing method according to an embodiment of this application includes the following steps.

Step 101. Receive a query statement and generate a query plan tree corresponding to the query statement, where the query plan tree includes multiple layers of operators that are in a pipeline relationship, each layer includes at least one operator, and each operator includes operation symbols and a logical relationship between the operation symbols.

Step 102. Execute the query statement according to the query plan tree.

Step 103. Extract intermediate status information of a faulty operator when a fault occurs in a process of executing the query statement, where the intermediate status information is backed up at a backup time point before the execution fault occurs, the intermediate status information includes a completed operation and an operation uncompleted by the faulty operator at the backup time point, and the faulty operator is an operator that is executing the query statement when the execution fault occurs.

Step 104. Update operation symbols of the faulty operator and a logical relationship between the operation symbols according to the query plan tree and the intermediate status information of the faulty operator to obtain a reconstructed query plan tree.

Step 105. Continue to execute the query statement according to the reconstructed query plan tree after the fault is recovered to obtain a query result of the query statement.

Compared with other approaches, in the query fault processing method provided in this embodiment of this application, when a fault occurs, a query plan tree may be reconstructed according to intermediate status information of a faulty operator, and after the fault is recovered, execution of a query statement may be continued according to the reconstructed query plan tree, that is, the execution of the current query statement is continued from a location at which the fault occurs. Therefore, impact exerted on an entire query process by query interruption is reduced.

The query fault processing method provided in this embodiment of this application may be understood with reference to related descriptions in FIG. 1 to FIG. 6, and details are not described herein.

Modules included in a query fault processing apparatus 20 provided in an embodiment of this application and a relationship between the modules may be understood with reference to the database management system in FIG. 5 and FIG. 6, and details are not described herein.

The database management system or the query fault processing apparatus that is shown in FIG. 1 to FIG. 6 and that is provided in the embodiment of this application may be implemented using a server or a physical host. A server is used as an example below to describe a process of implementing the query fault processing method using the server.

Figure 8:
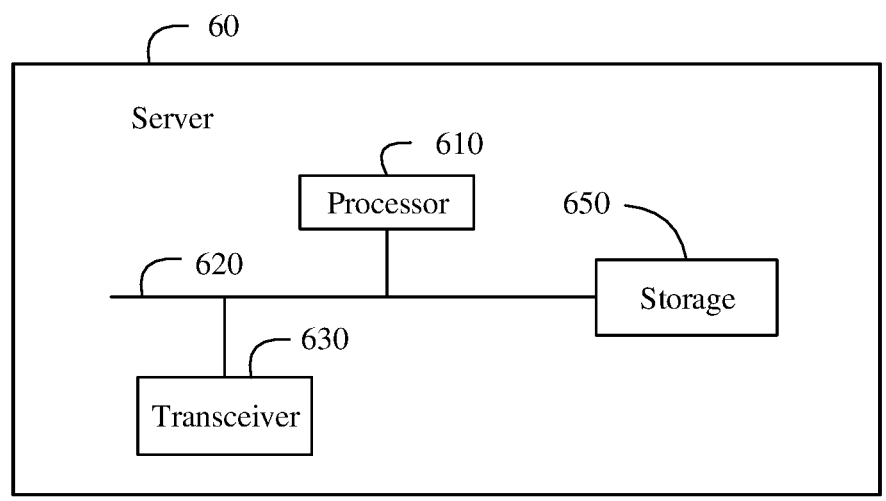
FIG. 8 is a schematic diagram of an embodiment of a server according to an embodiment of this application.

FIG. 8 is a schematic structural diagram of a server 60 according to an embodiment of this application. The server 60 includes a processor 610, a storage 650, and a transceiver 630. The storage 650 may include a read-only memory (ROM) and a random access memory (RAM), and provide an operation instruction and data for the processor 610. The storage 650 may further include a nonvolatile RAM (NVRAM).

In some implementations, the storage 650 stores the following elements an executable module or a data structure, or a subset thereof, or an extended set thereof.

In this embodiment of this application, when the server 60 performs a query fault processing function that is described in FIG. 1 to FIG. 7 and that is performed by the database management system or the query fault processing apparatus shown in FIG. 1 to FIG. 6, an operation instruction (the operating instruction may be stored in an operating system) that is stored in the storage 650 is invoked.

The transceiver 630 is configured to receive a query statement, generate a query plan tree corresponding to the query statement, where the query plan tree includes multiple layers of operators that are in a pipeline relationship, each layer includes at least one operator, and each operator includes operation symbols and a logical relationship between the operation symbols, execute the query statement according to the query plan tree, extract intermediate status information of a faulty operator when a fault occurs in a process of executing the query statement, where the intermediate status information is backed up at a backup time point before the execution fault occurs, the intermediate status information indicates an operation completed by the faulty operator and an operation uncompleted by the faulty operator at the backup time point, and the faulty operator is an operator that is executing the query statement when the execution fault occurs, update operation symbols of the faulty operator and a logical relationship between the operation symbols according to the query plan tree and the intermediate status information of the faulty operator, to obtain a reconstructed query plan tree, and continue to execute the query statement according to the reconstructed query plan tree after the fault is recovered, to obtain a query result of the query statement.

Compared with the other approaches, according to the server 60 provided in this embodiment of this application, when a fault occurs, a query plan tree may be reconstructed according to intermediate status information of a faulty operator, and after the fault is recovered, execution of a query statement may be continued according to the reconstructed query plan tree, that is, the execution of the current query statement is continued from a location at which the fault occurs. Therefore, impact exerted on an entire query process by query interruption is reduced.

The processor 610 controls an operation of the server 60, and the processor 610 may further be referred to as a CPU. The storage 650 may include a ROM and a RAM, and provide an instruction and data for the processor 610. The storage 650 may further include an NVRAM. In specific application, all components of the server 60 are coupled together using a bus system 620, and the bus system 620 may further include a power bus, a control bus, a state signal bus, and the like in addition to a data bus. However, for clarity of description, various buses are marked as the bus system 620 in FIG. 8.

The method disclosed in the foregoing embodiment of this application may be applied to the processor 610, or implemented by the processor 610. The processor 610 may be an integrated circuit chip, and have a signal processing capability. In an implementation process, steps in the foregoing method may be completed using an integrated logic circuit of hardware in the processor 610 or an instruction in a form of software. The foregoing processor 610 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 610 may implement or perform methods, steps, and logical block diagrams disclosed in the embodiment of this application. The general purpose processor may be a microprocessor, or the processor 610 may also be any conventional processor, or the like. Steps of the methods disclosed with reference to the embodiment of this application may be directly executed and completed using a hardware decoding processor, or may be executed and completed using a combination of hardware and software modules in a decoding processor. The software module may be located in a mature storage medium in the field, such as a RAM, a flash storage, a ROM, a programmable ROM (PROM), an electrically-erasable PROM (EEPROM), or a register. The storage medium is located in the storage 650. The processor 610 reads information from the storage 650, and completes the steps of the foregoing methods.

Optionally, the processor 610 is further configured to selectively back up the intermediate status information of the faulty operator based on a backup cost of an intermediate status of the faulty operator.

Optionally, the processor 610 is further configured to periodically perform the step of selective backup.

Optionally, the processor 610 is further configured to back up the intermediate status information of the faulty operator when a cost reduced by continuing to execute the faulty operator is greater than a sum of a cost required for backing up the operation completed by the faulty operator and a cost required for recovering the operation uncompleted by the faulty operator.

Optionally, the processor 610 is further configured to back up the intermediate status information of the faulty operator when a cost of continuing to execute the faulty operator is less than a sum of a cost required for backing up the operation completed by the faulty operator and a cost required for recovering the operation uncompleted by the faulty operator.

Optionally, the processor 610 is further configured to recursively process the uncompleted operation and the completed operation to obtain reconstructed information of the faulty operator, where the reconstructed information includes reconstructed operation symbols and a logical relationship between the reconstructed operation symbols, and update, according to the reconstructed information, original information that is in the faulty operator of the query plan tree and that is corresponding to the reconstructed information, to obtain the reconstructed query plan tree, where the original information includes original operation symbols and a logical relationship between the original operation symbols.

Optionally, the processor 610 is further configured to set an end operation symbol for the completed operation, and set, in the uncompleted operation, a start operation symbol that is used to mark a start location of the uncompleted operation to obtain the reconstructed operation symbols and the logical relationship between the reconstructed operation symbols.

Optionally, the processor 610 is further configured to record the query statement when the cost reduced by continuing the execution is less than the sum of the required costs, where the query statement is used for regenerating the query plan tree after the query fault is recovered.

Optionally, the processor 610 is further configured to record the query statement when the cost of continuing the execution is greater than the sum of the required costs, where the query statement is used for regenerating the query plan tree after the query fault is recovered.

Optionally, the processor 610 is further configured to record the query statement when a fault occurs during generation of the query plan tree, where the query statement is used for regenerating the query plan tree after the query fault is recovered.

The server described in FIG. 8 may be understood with reference to the query management device in FIG. 1 to FIG. 6, and details are not described herein.

A person of ordinary skill in the art may understand that all or a part of the steps of the methods in the foregoing embodiments may be implemented by a program instructing relevant hardware. The program may be stored in a computer readable storage medium. The storage medium may include a ROM, a RAM, a magnetic disk, or an optical disc.

What is claimed is:

1. A query fault processing method, comprising:
receiving a query statement;
generating a query plan tree corresponding to the query statement, the query plan tree comprising a plurality of layers of operators in a pipeline relationship, each layer comprising at least one operator, and each operator comprising operation symbols and a logical relationship among the operation symbols;
executing the query statement according to the query plan tree;
extracting intermediate status information of a faulty operator when a fault occurs in a process of executing the query statement, the intermediate status information being backed up at a backup time point before the fault occurs, the intermediate status information indicating an operation completed by the faulty operator and an operation uncompleted by the faulty operator at the backup time point, and the faulty operator being an operator executing the query statement when the fault occurs;
updating operation symbols of the faulty operator and a logical relationship among the operation symbols of the faulty operator according to the query plan tree and the intermediate status information of the faulty operator to obtain a reconstructed query plan tree; and
continuing to execute the query statement according to the reconstructed query plan tree after the fault is recovered to obtain a query result of the query statement.

2. The processing method of claim 1, further comprising selectively backing up the intermediate status information of the faulty operator based on a backup cost of an intermediate status of the faulty operator.

3. The processing method of claim 2, further comprising periodically performing selectively backing up the intermediate status information of the faulty operator based on the backup cost of the intermediate status of the faulty operator.

4. The processing method of claim 2, wherein selectively backing up the intermediate status information of the faulty operator comprises backing up the intermediate status information of the faulty operator when a cost reduced by continuing to execute the faulty operator is greater than a sum of a cost required for backing up the operation completed by the faulty operator and a cost required for recovering the operation uncompleted by the faulty operator.

5. The processing method of claim 2, wherein selectively backing up the intermediate status information of the faulty operator comprises backing up the intermediate status information of the faulty operator when a cost of continuing to execute the faulty operator is less than a sum of a cost required for backing up the operation completed by the faulty operator and a cost required for recovering the operation uncompleted by the faulty operator.

6. The processing method of claim 1, wherein updating the operation symbols of the faulty operator and the logical relationship among the operation symbols of the faulty operator comprises:
  recursively processing the uncompleted operation and the completed operation to obtain reconstructed information of the faulty operator, the reconstructed information comprising reconstructed operation symbols and a logical relationship among the reconstructed operation symbols; and
  updating, according to the reconstructed information, original information in the faulty operator of the query plan tree corresponding to the reconstructed information to obtain the reconstructed query plan tree, the original information comprising original operation symbols and a logical relationship among the original operation symbols.

7. The processing method of claim 6, wherein recursively processing the uncompleted operation and the completed operation to obtain the reconstructed information of the faulty operator comprises:
  setting an end operation symbol for the completed operation; and
  setting, in the uncompleted operation, a start operation symbol marking a start location of the uncompleted operation to obtain the reconstructed operation symbols and the logical relationship among the reconstructed operation symbols.

8. A database server, comprising:
  a storage to store a computer executable program; and
  at least one processor coupled to the storage, the computer executable program causing the at least one processor to be configured to:
    receive a query statement;
    generate a query plan tree corresponding to the query statement, the query plan tree comprising a plurality of layers of operators in a pipeline relationship, each layer comprising at least one operator, and each operator comprising operation symbols and a logical relationship among the operation symbols;
    execute the query statement according to the query plan tree;
    extract intermediate status information of a faulty operator when a fault occurs in a process of executing the query statement, the intermediate status information being backed up at a backup time point before the fault occurs, the intermediate status information indicating an operation completed by the faulty operator and an operation uncompleted by the faulty operator at the backup time point, and the faulty operator being an operator executing the query statement when the fault occurs;
    update operation symbols of the faulty operator and a logical relationship among the operation symbols of the faulty operator according to the query plan tree and the intermediate status information of the faulty operator to obtain a reconstructed query plan tree; and
    continue to execute the query statement according to the reconstructed query plan tree after the fault is recovered to obtain a query result of the query statement.

9. The database server of claim 8, wherein the computer executable program further cause the at least one processor to be configured to selectively back up the intermediate status information of the faulty operator based on a backup cost of an intermediate status of the faulty operator.

10. The database server of claim 9, wherein the computer executable program further cause the at least one processor to be configured to periodically perform selectively backing up the intermediate status information of the faulty operator based on the backup cost of the intermediate status of the faulty operator.

11. The database server of claim 9, wherein the computer executable program further cause the at least one processor to be configured to back up the intermediate status information of the faulty operator when a cost reduced by continuing to execute the faulty operator is greater than a sum of a cost required for backing up the operation completed by the faulty operator and a cost required for recovering the operation uncompleted by the faulty operator.

12. The database server of claim 9, wherein the computer executable program further cause the at least one processor to be configured to back up the intermediate status information of the faulty operator when a cost of continuing to execute the faulty operator is less than a sum of a cost required for backing up the operation completed by the faulty operator and a cost required for recovering the operation uncompleted by the faulty operator.

13. The database server of claim 8, wherein the computer executable program further cause the at least one processor to be configured to:
  recursively process the uncompleted operation and the completed operation to obtain reconstructed information of the faulty operator, the reconstructed information comprising reconstructed operation symbols and a logical relationship among the reconstructed operation symbols; and
  update, according to the reconstructed information, original information in the faulty operator of the query plan tree corresponding to the reconstructed information to obtain the reconstructed query plan tree, the original information comprising original operation symbols and a logical relationship among the original operation symbols.

14. The database server of claim 13, wherein the at least one processor is further configured to:
  set an end operation symbol for the completed operation; and
  set, in the uncompleted operation, a start operation symbol marking a start location of the uncompleted operation to obtain the reconstructed operation symbols and the logical relationship among the reconstructed operation symbols.

15. A non-transitory computer readable storage medium storing instructions that, when executed by at least one processor, cause the at least one processor to:
  receive a query statement;
  generate a query plan tree corresponding to the query statement, the query plan tree comprising a plurality of layers of operators in a pipeline relationship, each layer comprising at least one operator, and each operator comprising operation symbols and a logical relationship among the operation symbols;

execute the query statement according to the query plan tree;

extract intermediate status information of a faulty operator when a fault occurs in a process of executing the query statement, the intermediate status information being backed up at a backup time point before the fault occurs, the intermediate status information indicating an operation completed by the faulty operator and an operation uncompleted by the faulty operator at the backup time point, and the faulty operator being an operator executing the query statement when the fault occurs;

update operation symbols of the faulty operator and a logical relationship among the operation symbols of the faulty operator according to the query plan tree and the intermediate status information of the faulty operator to obtain a reconstructed query plan tree; and continue to execute the query statement according to the reconstructed query plan tree after the fault is recovered to obtain a query result of the query statement.

16. The non-transitory computer readable storage medium of claim 15, wherein the instructions further cause the at least one processor to selectively back up the intermediate status information of the faulty operator based on a backup cost of an intermediate status of the faulty operator.

17. The non-transitory computer readable storage medium of claim 16, wherein when selectively backing up the intermediate status information, the instructions further cause the at least one processor to back up the intermediate status information of the faulty operator when a cost reduced by continuing to execute the faulty operator is greater than a sum of a cost required for backing up the operation completed by the faulty operator and a cost required for recovering the operation uncompleted by the faulty operator.

18. The non-transitory computer readable storage medium of claim 16, wherein when selectively backing up the intermediate status information, the instructions further cause the at least one processor to back up the intermediate status information of the faulty operator when a cost of continuing to execute the faulty operator is less than a sum of a cost required for backing up the operation completed by the faulty operator and a cost required for recovering the operation uncompleted by the faulty operator.

19. The non-transitory computer readable storage medium of claim 15, wherein the instructions further cause the at least one processor to periodically selectively back up the intermediate status information of the faulty operator based on a backup cost of an intermediate status of the faulty operator.

20. The non-transitory computer readable storage medium of claim 15, wherein when updating the operation symbols of the faulty operator and the logical relationship among the operation symbols of the faulty operator, the instructions further cause the at least one processor to:

recursively process the uncompleted operation and the completed operation to obtain reconstructed information of the faulty operator, the reconstructed information comprising reconstructed operation symbols and a logical relationship among the reconstructed operation symbols; and update, according to the reconstructed information, original information in the faulty operator of the query plan tree corresponding to the reconstructed information to obtain the reconstructed query plan tree, the original information comprising original operation symbols and a logical relationship among the original operation symbols.

* * * * *